United States Patent [19]
Pellerin

[11] Patent Number: 5,820,153
[45] Date of Patent: Oct. 13, 1998

[54] VEHICLE SUSPENSION SYSTEM

[76] Inventor: Luc Pellerin, 577, Chemin Nord, Eastman, Québec, Canada, J03E 1P0

[21] Appl. No.: 797,205

[22] Filed: Feb. 11, 1997

Related U.S. Application Data

[63] Continuation-in-part of Ser. No. 588,725, Jan. 19, 1996, abandoned.

[51] Int. Cl.$^6$ ..................................................... B60G 11/00
[52] U.S. Cl. .................. 280/688; 280/112.1; 280/112.2; 280/120; 280/125; 280/689; 280/724
[58] Field of Search ..................................... 280/688, 689, 280/109, 110, 111, 112.1, 112.2, 113, 114, 115, 117, 118, 120, 724, 126, 125, 127, 128, 129, 130, 131, 133, 134, 136

[56] References Cited

U.S. PATENT DOCUMENTS

| | | |
|---|---|---|
| 3,202,441 | 8/1965 | Tea . |
| 4,826,203 | 5/1989 | Kijima et al. . |
| 5,048,860 | 9/1991 | Kanai et al. . |
| 5,127,666 | 7/1992 | Fujinaka et al. . |

FOREIGN PATENT DOCUMENTS 1238351  6/1988  Canada .

OTHER PUBLICATIONS

Canadian Patent application 2,033,854, Sawai, S., filed Jan. 9, 1991.
Canadian Patent application 2,064,278, Nishida et al., filed Mar. 27, 1992.
Canadian Patent application 2,066,390, Velazquez, Alfonso B., filed Apr. 16, 1992.

*Primary Examiner*—Eric D. Culbreth
*Attorney, Agent, or Firm*—Merek & Voorhees

[57] ABSTRACT

A suspension system for controlling the relative displacement between a pair of laterally opposed ground engaging components of a vehicle and the frame of the vehicle is disclosed herein. Each of the ground engaging components is individually fixed to the frame by a frame connecting component. The frame connecting component is hingedly mounted to the frame so as to allow a relative pivotal movement between each of the frame connecting components and the frame. The suspension system includes a first suspension member pivotally mounted to the frame to pivot about a first suspension member pivotal axis. The suspension system also including a second suspension member pivotally mounted to the first suspension member to pivot relatively to the first suspension member about along a second suspension member pivotal axis perpendicular to the first suspension member pivotal axis. 1The suspension system further includes a biasing mechanism mounted both to the frame and to the second suspension member. The biasing mechanism biases the second suspension member towards a second suspension member initial predetermined position.

16 Claims, 7 Drawing Sheets

VEHICLE SUSPENSION SYSTEM

This continuation-in-part of application Ser. No. 08/588,725 filed Jan. 19, 1996, abandoned.

FIELD OF THE INVENTION

The present invention relates to the field of vehicle suspension systems and is particularly concerned with a vehicle suspension system having a pair of perpendicularly oriented pivotal articulations.

BRIEF DESCRIPTION OF THE PRIOR ART

Most conventional modern vehicles are provided with a suspension system connecting a frame of the vehicle to components of the vehicle which engage the ground surface such as wheels, skis, tracks or the like. Conventional modern suspension systems are made up of many elements including control arms, stabilizer bars and flexible elements such as springs and shock absorbers. The suspension systems must be designed to allow each ground engaging component to be moved up and down to the full extent required to keep all of the ground engaging elements in continuous contact with the ground surface while restricting such movement to what is consistent with adequate comfort requirements.

The flexible elements of the suspension system must be strong enough to support the load without using up the ground engaging components travel that is needed for bump deflections and, yet, soft enough to insulate the passenger compartment from suspension movements. It is also desirable that the suspension system should allow the ground engaging component to move back and forth to a small extent (horizontal compliance). Far more important, however, is the need for the suspension links to avoid tilting the ground engaging elements far out of their planes of motion (camber changes during deflections). The latter characteristic is vital to the safe handling of the vehicle when the latter is in motion. Precise guidance of the ground engaging element throughout its full course of deflection should be assured to minimize not only camber changes, but also changes in caster, track and wheel base.

The suspension systems on modern vehicles are thus designed to combine many important variables in a compromise to achieve suitable handling and ride characteristics. Design objectives differ depending on the type of vehicle and the conditions in which it is destined to be operated.

Some variables are particularly important when designing suspension systems. For example, the spring rate which determines, in part, the stiffness with which the suspension system will transmit an impacting force from the ground engaging elements to the frame of the vehicle is particularly important.

A second crucial variable is the so-called roll effect. Roll is the sway or lean that occurs in the body of the vehicle due to side forces acting on the latter. The side forces are usually centrifugal forces generated by the yawing of the vehicle. Yaw is usually driver induced by steering wheel input, but can also be caused by roadway unevenness or a difference in tire-to-roadway friction between left and right wheels, especially under hard acceleration or braking.

One popular type of modern suspension system is the so-called independent suspension system wherein each road engaging element is provided with an independent spring and dampening component. Most conventional modern vehicles having independent-type suspension systems use stabilizer bars also called anti-roll bars to control the amount of roll. The rate of resistance to roll of conventional stabilizer bars is typically substantially linear. It is the combined action of the stabilizer bars and the spring stiffness that determines how much roll of the frame will be induced by a given lateral force.

Typically, the stabilizer bar is connected between the suspension control arms on both sides of the vehicle. When the vehicle body comes closer to the road surface, the suspension is in jounce. When jounce affects both left and right wheels equally, the stabilizer bar follows the suspension and so it has no effect on the vehicle. As the vehicle encounters a rise in road surface with a single wheel, the upward force is transferred across the stabilizer bar producing an upward force on the suspension on the opposite side of the vehicle. This transfers a portion of the jounce load to the opposite suspension. The action typically twists the stabilizer bar much like a torsion bar. This twisting action increases the effective spring rate of the suspension in jounce. The transmission of forces when a single wheel is raised is detrimental to the comfort of the passengers and to the wheel compliance with the ground surface. The stronger the anti-roll mechanism being used in a conventional suspension, the more induced roll to the chassis will be generated.

The stabilizer bar can be considered as a spring that will resist the independent action of the suspension. It will transfer some of the load from one suspension to the other, in order to help prevent excessive vehicle body roll. As one wheel drops, or rebounds, due to a drop in the road surface, the stabilizer bar exerts an upward force on the suspension of the wheel encountering the low spot. This will reduce the effective spring rate of that wheel. As a vehicle enters a turn, the vehicle body leans towards the outside of the turn and this forces the outside suspension into compression, while the suspension on the inside will go on rebound. The stabilizer bar opposes both of these motions by increasing the effective spring rate of the outside wheel and decreasing the effect of spring rate of the inside wheel.

The stabilizer bar also resists body movements due to wind gusts and rolling road surfaces that may be noticeable at highway speeds by applying forces on the suspension that oppose vehicles input forces, i.e. one wheel going into jounce while the other goes into rebound.

A reduced vehicle spring rate can be used when sturdy stabilizer bars are used. This will provide the vehicle with soft rise springing while at the same time have the handling characteristics of stiffer springing.

However, a compromise must again be made in the choice of the stiffness of the stabilizer bar. Indeed, if the stabilizer bar is made particularly rigid, the vehicle will be difficult to control on rough road surfaces. Conversely, if the stabilizer bar is not stiff enough, it loses its effects.

For vehicles requiring a particularly rigid anti-roll mechanism, such as race cars, a suspension design commonly referred to as a monoshock design has been developed. The monoshock design uses "push-pull" rods to link the outer ends of the lower suspension tables of the vehicles to a common rocker assembly in the transverse axis which is fixed to the chassis. The pivoting action is limited by a mechanism comprising a spring and damper element.

This type of arrangement provides for very rigid anti-roll characteristics. Indeed, when one of the wheels is forced upwardly, the upward movement is transferred integrally to the opposite wheel. In order to allow a wheel to be individually raised, when for example going over small bumps, a mechanical means is used to allow lateral movement of the rocker assembly. The lateral movement of the rocker assembly is generally limited by some springing action and positive stops. Performance of suspension system using the so-called monoshock design on relatively smooth tracks has proven to be efficient. However, rough tracks create various instability problems. Indeed, whenever a given wheel is raised by a bump in excess of the lateral travel of the rocker assembly, the raising of the opposite wheel creates a sudden overall loss of adhesion.

OBJECTS OF THE INVENTION

An object of the present invention is therefore to provide an improved vehicle suspension.

SUMMARY OF THE INVENTION

More specifically, in accordance with the present invention, there is provided a suspension system for controlling the relative displacement between a pair of laterally opposed ground engaging assemblies of a vehicle and a longitudinal frame of the vehicle, the suspension system comprising:

a first suspension member;

means for mounting the first suspension member to the frame while allowing the first suspension member and the frame to pivot relatively to one another about a first pivotal axis substantially transversal to the frame;

a second suspension member;

means for mounting the second suspension member to the first suspension member while allowing the first suspension member and the second suspension member to pivot relatively to one another about a second pivotal axis, the second pivotal axis being substantially perpendicular to the first pivotal axis;

a biasing assembly swingably mounted between the frame and the second suspension member for biasing the second suspension member towards a predetermined position;

a pair of elongated motion transmitting members, each of the elongated motion transmitting members having a distal end swingably mounted to one of the laterally opposed ground engaging assemblies, and a proximate end swingably mounted to the second suspension member; wherein the relative displacement between the pair of laterally opposed ground assemblies and the longitudinal frame of the vehicle is transferred to the biasing assembly by the elongated motion transmitting members and the second suspension member to thereby enable the biasing assembly to control the relative displacement.

Advantages of the present invention include the partial or total elimination of conventional anti-roll devices such as torsion bars or the like. Consequently, whenever a given ground engaging component is individually raised relatively to the frame of the vehicle, the laterally opposed ground engaging component is not initially raised off the ground surface. In fact, with a suspension system in accordance with the present invention, the raising of a given ground engaging component relatively to the frame causes the laterally opposed ground engaging component to be initially biased downwardly, against the ground surface, therefore improving the contact between the ground engaging component and the ground surface.

Another advantage of the present invention lies in the fact that the suspension system in accordance with the present invention transfers less lateral forces to the frame of the vehicle, which, in turn, induces less frame roll.

A further advantage of the invention is that the suspension system will adapt itself to various situations as it will become stiffer as it is solicitated. For example, when used on racing cars having down force creating components, the suspension system will allow a softer ride and better tire compliance at low speeds such as in slow turns and a much higher resistance to roll at higher turning speeds.

A still further advantage of the suspension system in accordance with the present invention is that the suspension system will provide improved handling characteristics, for example when installed to performances vehicles such as race cars.

Other objects, advantages and features of the present invention will become more apparent upon reading of the following non-restrictive description of preferred embodiments thereof, given by way of example only with reference to the accompanying drawings.

DETAILED OF THE PREFERRED EMBODIMENTS

Figure 1:
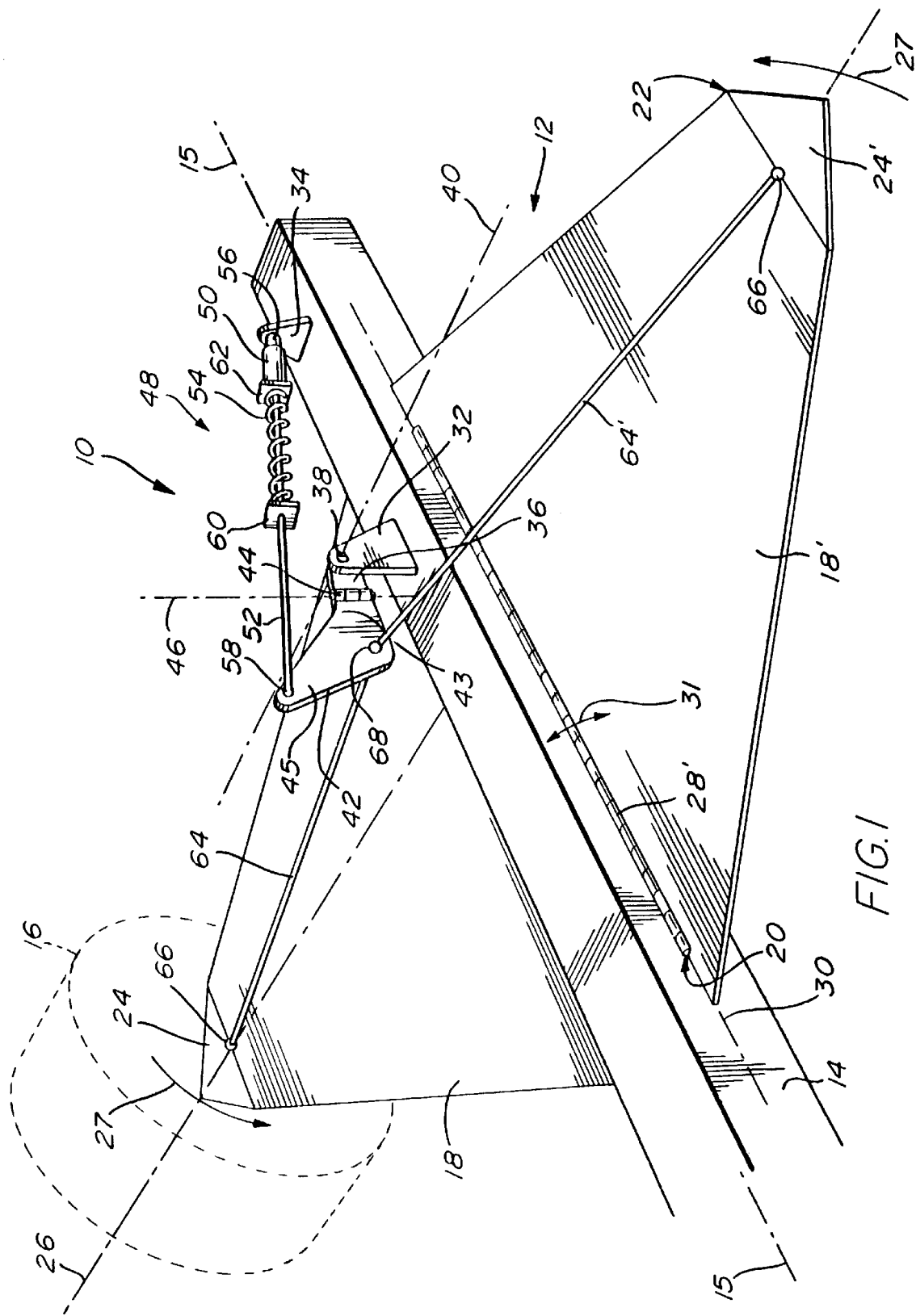
FIG. 1 is a perspective view illustrating a schematic representation of a suspension system in accordance with a first embodiment of the invention mounted on a schematized vehicle frame, the suspension system being shown in an unloaded configuration.

Referring to FIG. 1, there is shown a schematic representation of a vehicle suspension system 10 in accordance with a first embodiment of the present invention. The suspension system 10 is shown mounted adjacent a rear section of a schematic vehicle 12. The vehicle 12 has a generally elongated frame 14 extending along a longitudinal axis 15.

A pair of opposed ground engaging components such as lateral wheels 16,16' (only wheel 16 being shown in FIG. 1) are hingedly connected to the frame 14 by a corresponding pair of wheel-to-frame linking components schematized in the drawings by a pair of suspension tables 18,18' to form a pair of schematized ground engaging assemblies. Each suspension table 18,18' has an inner end 20 and an outer end 22. Each suspension table 18,18' has a table-to-wheel connecting element 24,24' positioned adjacent its outer end 22 for rotatably connecting one of the wheels 16,16' to a corresponding suspension table 18,18'.

The table-to-wheel connecting elements 24,24' allow rotation of the wheels 16,16' about a wheel rotational axis 26. The rotation of the wheels 16,16' is schematically indicated by the arrows 27. Each suspension table 18,18' individually has a table-to-frame connecting element 28,28' for hingedly connecting the inner ends 20 of the suspension tables 18,18' to the frame 14. The table-to-frame connecting elements 28,28' individually allow a suspension table 18,18' and the frame 14 to pivotally move relatively to one another about a table-to-frame pivotal axis 30 which extends substantially longitudinally along the frame 14. The relative pivotal movement between the suspension tables 18,18' and the frame 14 are schematized by arrow 31.

It should be understood that the suspension tables 18,18' herein described are schematized representations of a pivotal link between the frame 14 and the wheels 16,16' of the vehicle 12. Any suitable rigid linking component allowing transmission of the pivotal movement of the wheels 16,16' relatively to the frame 14 such as conventional suspension arms or superposed suspension table arrangements could be used without departing from the scope of the present invention. Also, the wheels 16,16' are schematized representations of ground engaging components. Any other type of ground engaging component such as skis, track, or the like could be used without departing from the scope of the present invention.

The vehicle 12 also has a first spacing component 32 and a second spacing component 34. The first spacing component 32 and the second spacing component 34 both extend outwardly from the frame 14. The first spacing component 32 and the second spacing component 34 are substantially centrally located relatively to the lateral peripheral edges of the frame 14. The first spacing component 32 and the second spacing component 34 are substantially aligned along the longitudinal axis 15 and are spaced longitudinally from each other.

The suspension system 10 includes a first suspension member 36 which is pivotally attached to the first spacing component 32 by a first pivotal mounting arrangement schematized by a pivoting pin 38 extending through both the first spacing component 32 and the first suspension member 36.

The pivoting pin 38 solidly attaches the first suspension member 36 to the first spacing component 32 while allowing a relative pivotal movement between the first suspension member 36 and the first spacing component 32 about a first pivotal axis 40. The first pivotal axis 40 extends substantially perpendicularly to the longitudinal axis 15 of the frame 14.

Typically, the longitudinal axis 15 and the first pivotal axis 40 both extend in a direction which is substantially parallel to the ground surface on which the wheels 16,16' are supported when the vehicle 12 is in use. The first pivotal axis 40 is thus substantially transversally oriented relatively to the frame 14.

A second suspension member 42 is pivotally attached to the first suspension member 36 by a second pivotal mounting arrangement schematized by a hinge-type connection 44. The hinge-type connection 44 solidly attaches the second suspension member 42 to the first suspension member 36 while allowing a relative pivotal movement between the second suspension member 42 and the first suspension member 36 about a second pivotal axis 46.

The second pivotal axis 46 extends in a direction which is substantially perpendicular to the first pivotal axis 40. The second pivotal axis 46 is spaced from the first pivotal axis 40, in the direction of the axis 15, by a first member spacing distance indicated in FIGS. 2 and 5 by the reference D1.

The second suspension member 42 is configured and sized so that a segment of the latter will be off-centered relatively to the first pivotal axis 40 in a direction parallel to the second pivotal axis 46. In one embodiment, the second suspension member 42 has a substantially V-shaped configuration defining a pair of rigidly connected diverging segments 43 and 45.

A biasing arrangement 48 extends between the second suspension member 42 and the second spacing component 34. The biasing arrangement 48 typically comprises a suspension damper 50, a piston rod 52 slidably inserted into the suspension damper 50 and a helicoidal suspension spring 54. The biasing arrangement 48 is substantially centrally located relatively to the transversal peripheral edges of the frame 14. It should be understood that other types of suitable biasing arrangements such as hydraulic or pneumatic actuators and dampers, torsion bars or other similar biasing arrangements could be used without departing from the scope of the present invention.

The suspension damper 50 is swingably mounted to the second spacing component 34 by a universal-type joint such as a damper ball-and-socket joint 56. Similarly, the piston rod 52 is swingably mounted to the second suspension member 42 by a universal-type joint such as a rod ball-and-socket joint 58. The suspension spring 54 abuts at one of its longitudinal ends against a rod plate 60 fixedly mounted to the piston rod 52. The suspension spring 54 abuts at its other longitudinal end against a damper plate 62 fixedly mounted to the suspension damper 50.

A pair of "push-pull" type of motion transmitting rods 64,64' extends between the second suspension member 42 and the suspension tables 18. The motion transmitting rods 64,64' are typically obliquely and symmetrically disposed relatively to the longitudinal axis 15. Each motion transmitting rod 64,64' is fixed at one of its longitudinal ends to a suspension table 18,18' preferably adjacent to the outer end 22 thereof. Each motion transmitting rod 64,64' is swingably mounted to a corresponding suspension table 18,18' by a universal-type joint such as a ball-and-socket joint 66. The other longitudinal end of each motion transmitting rod 64,64' is swingably mounted to the second suspension member 42, preferably adjacent the intersection of the segments 43 and 45 thereof, by a universal-type joint such as a ball-and-socket joint 68.

It to be noted that the ball-and socket joints 56, 58, 66 and 68 shown in the appended Figures are schematic representation of actual ball-and-socket joints.

Figure 2:
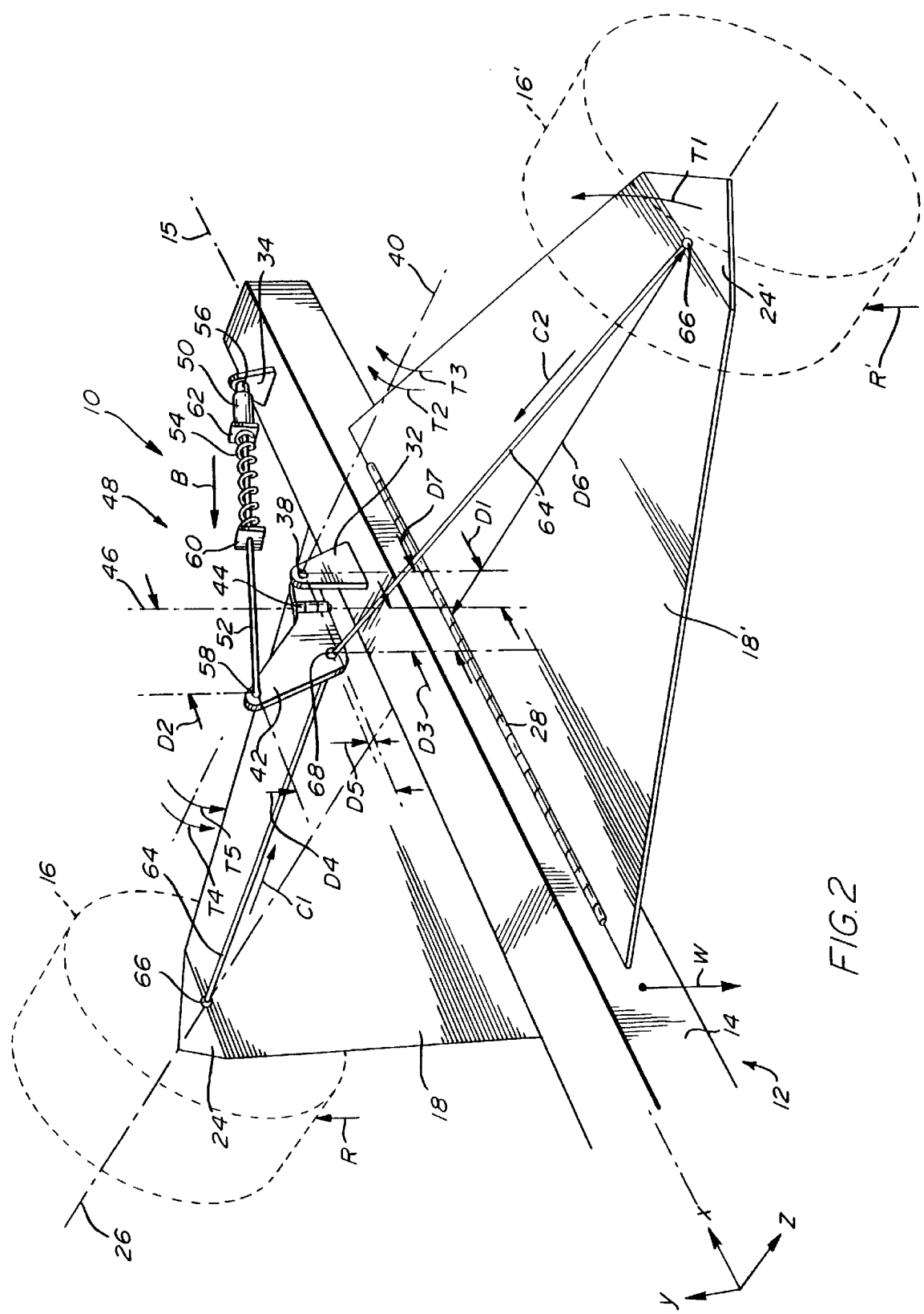
FIG. 2 shows a perspective view of the suspension system of FIG. 1 in a symmetrically loaded configuration.
Figure 5:
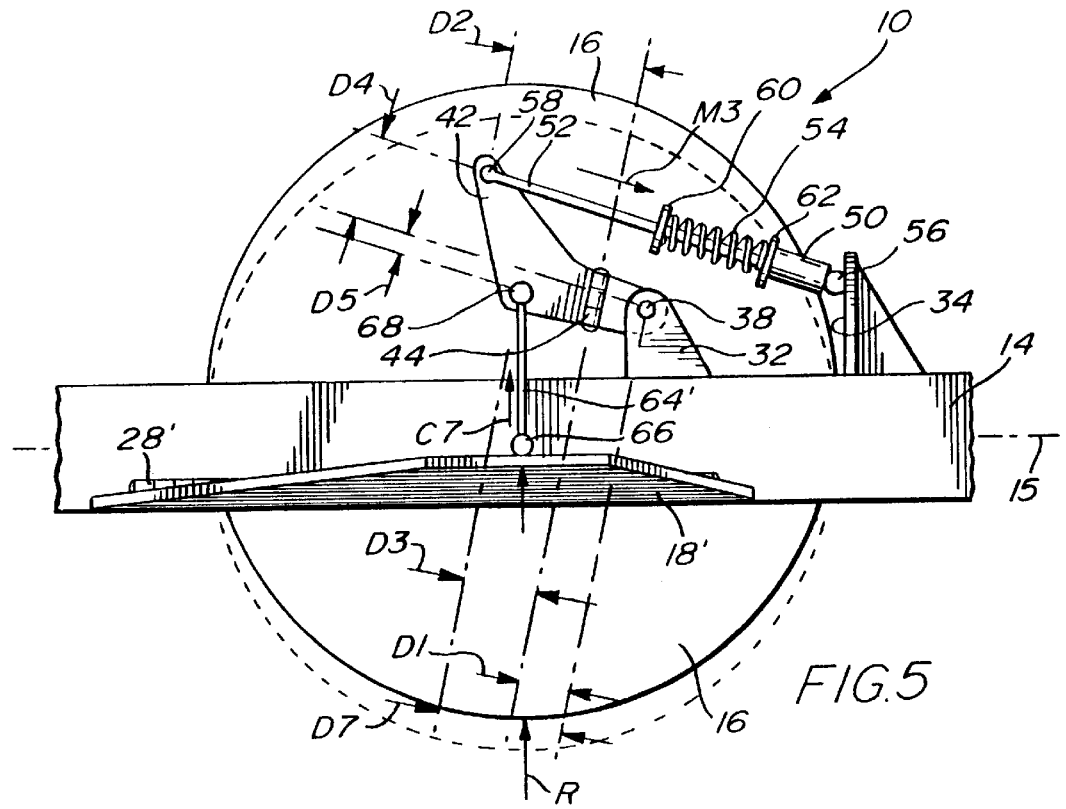
FIG. 5 shows a side elevational view of the suspension system of FIG. 1 where one of the wheels to which it is attached is raised.

As illustrated more specifically in FIGS. 2 and 5, the rod ball-and-socket joint 58 is spaced from the first pivotal axis 46, in the direction of the 15 axis, by a distance D2. The ball-and-socket joint 68 is spaced from the second pivotal axis 46, in the direction of the axis 15, by a first transmitting rod joint spacing distance D3. In the preferred embodiment, the second suspension member 42 is configured so that the distance D2 is greater than the distance D3.

The rod ball-and-socket joint 58 is spaced from the first pivotal axis 40, in the direction of the second pivotal axis 46 axis, by a distance D4. The ball-and-socket joint 68 is spaced from the first pivotal axis 40, in the direction of the second pivotal axis 46, by a distance D5. In the preferred embodiment, the second suspension member 42 is configured so that the distance D4 is greater than the distance D5.

The pivoting pin 38, the ball and socket joint 68 and the ball and socket joint 58 therefore form an obtuse angle where the ball-and-socket joint 68 is the vertex.

The reactions of the suspension system 10 in various operating conditions will hereinafter be discussed with reference to FIGS. 2 through 6. In order to facilitate the description of the various forces involved and of the movements generated by these forces, a Cartesian coordinate system will be used. In this Cartesian coordinate system, a first coordinate axis X extends in a direction parallel to the reference axis 15. A second coordinate axis Y extends in a direction parallel to the second pivotal axis 46 while a third coordinate axis Z extends in a direction parallel to the first pivotal axis 40.

FIG. 2 illustrates a situation where the vehicle 12 is immobile on a relatively flat and horizontal ground surface. The only forces acting on the vehicle 12 are the weight of the vehicle 12 schematized by the arrow W, the ground reactive forces schematized by the arrows R,R' and a biasing force B produced by the suspension spring 54. Since the ground surface is substantially horizontal, the direction of the weight force W and of the reactive forces R,R' are oriented substantially perpendicularly to the latter. Furthermore, since the ground surface is flat and the suspension system 10 is symmetrical relatively to the longitudinal axis 15, the biasing arrangement 48 is in a substantially symmetrical relationship with the lateral peripheral edges of the frame 14.

The reactive forces R,R' are transmitted to the suspension tables 18,18' by the table-to-wheel connecting elements 24,24'. The forces transmitted to the suspension tables 18,18' tend to create a torque T1 which is proportional to both the magnitude of the ground reactive forces R,R' and a distance D6, in the direction of the Z axis, between one of the table-to-frame connecting elements 28,28' and a proximal table-to-wheel connecting element 24.

The ground reactive forces R,R' are transmitted to the second suspension member 42 by the motion transmitting rods 64,64'. One of the main features of the present invention resides in the fact that when a force tending to raise one of the suspension tables 18,18' is applied to the latter, the force is instantaneously transmitted to the other suspension table 18,18' by the motion transmitting rods 64'.

Indeed, since the motion transmitting rods 64,64' are both attached to the second suspension member 42 and since the latter is allowed to pivot freely about the second pivotal axis 46, the force applied to one suspension table is automatically applied to the other suspension table.

The motion transmitting rods 64,64' typically have a three-dimensional oblique orientation relatively to the previously defined Cartesian coordinate system. The compressive forces generated in each of the motion transmitting rods 64,64' are respectively identified by the reference characters C1 and C2. As mentioned previously, the motion transmitting rods 64,64' are symmetrically disposed relatively to the longitudinal axis 15. Consequently, if the ground reactive forces R,R' have substantially the same magnitude, the component of the compressive forces C1 and C2 in the direction of the Z axis cancel each other.

The components of the compressive forces C1 and C2 in the direction of the Y axis both create a torque T2 which tends to rotate the first suspension member 36 about the first pivotal axis 40. Since both table-to-wheel connecting elements 24,24' are located below the suspension system 10, the components of the compressive forces C1 and C2 both tend to rotate the first suspension member 36 in the same direction. The torque T2 is proportional to the vectorial sum of the components in the direction of the Y axis of the compressive forces C1 and C2 and to a distance D7, in the direction of the X axis, between the ball-and-socket joint 68 and the first pivotal axis 40.

The components of the compressive forces C1 and C2 in the direction of the X axis both create a torque T3 which also tends to rotate the first suspension member 36 about the first pivotal axis 40. The torque T3 is proportional to the vectorial sum of the components in the direction of the X axis of the compressive forces C1 and C2 and to a distance D5, in the direction of the Y axis, between the ball-and-socket joint 68 and the first pivotal axis 40.

The torques T2 and T3, generated by the compressive forces C1 and C2, are nullified by the vectorial sum of a pair of torques T4 and T5 generated by the biasing force B generated by the suspension spring 54 and transferred to the second suspension member 42 by the piston rod 52 at the ball-and-socket joint 58. The component of the biasing force B in the direction of the X axis creates a torque T4 which tends to rotate the first suspension member 36 about the first pivotal axis 40 in a direction opposite the rotation created by the torque T3. The torque T4 is proportional to the component in the direction of the X axis of the biasing force B and to the distance D4.

The component of the biasing force B in the direction of the Y axis creates a torque T5 which tends to rotate the first suspension member 36 about the first pivotal axis 40 in a direction opposite the rotation created by the torque T2. The torque T5 is proportional to the component in the direction of the Y axis of the biasing force B and to the distance D2.

The weight W of the vehicle 12 thus creates a set of opposed reaction forces R,R' applied on the wheels 16,16'. The wheels 16' transfer these forces to the suspension platforms 18,18' which, in turn, generate substantially equal compressive forces C1 and C2 in the motion transmitting rods 64,64'. The latter being symmetrically disposed relatively to the Z axis, the Z axis components of the forces C1 and C2 nullify each other. However, the X and Y axis components of the forces C1 and C2 generate respectively a pair of torques T2 and T3 which tend to rotate the suspension system 10 about the first pivotal axis 40.

The suspension system 10 is prevented from rotating about the first pivotal axis 40 by the biasing force B which also has an X axis and a Y axis component. The biasing force B generates a pair of torques T4 and T5, the vectorial sum of which equilibrates the torques T2 and T3. When the vehicle 12 is immobile on a relatively flat and horizontal surface, the suspension spring 54 which is adapted to support the weight W of the vehicle 14 is thus partially compressed from an uncompressed configuration to a configuration hereinafter referred to as a spring initial configuration.

Figure 3:
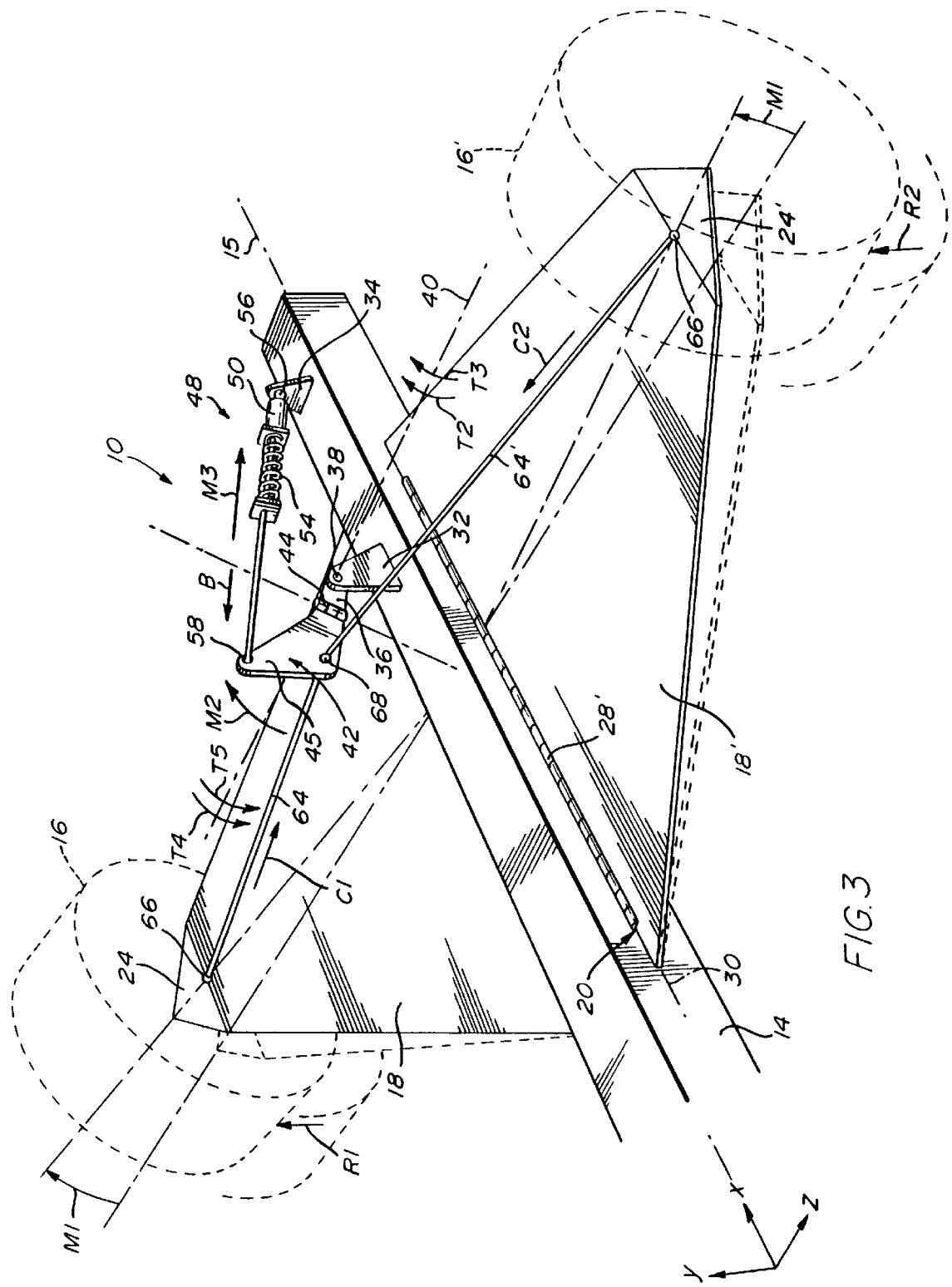
FIG. 3 shows a perspective view of the suspension system of FIG. 1 where both wheels to which it is attached are raised symmetrically.

FIG. 3 illustrates a situation wherein both of the suspension tables 18,18' are pivoted about their respective table-to-frame pivotal axis 30 by the same angular displacement M1. This type of situation occurs for example when both wheels 16,16' roll simultaneously over the same road bump or additional weight is loaded onto the frame 14 of the vehicle 12 symmetrically along the longitudinal axis 15.

In such instances, the reactive forces R,R' are suddenly increased in magnitude. The increase in the reactive forces R,R' is transmitted via the wheels 16,16', the table-to-wheel connecting elements 24,24' and the suspension tables 18,18' to the motion transmitting rods 64,64'. The increase in the reactive forces R,R' will thus cause the compressive forces C1 and C2 to also increase in magnitude. Since the motion transmitting rods 64,64' and the biasing arrangement 48 both remain symmetrically disposed relatively to the X axis, the components of the compressive forces C1 and C2 along the Z axis will again nullify each other and the biasing force B will again only generate components along the X and Y axis.

In fact, the situation is quite similar to the situation illustrated in FIG. 2 except that the torques T2 and T3 are temporarily increased, causing the first suspension member 36 to temporarily rotate about the first member pivoting axis 40. The angular displacement of the first suspension member 36 about the first member pivoting axis 40 is indicated by the reference M2. The angular displacement of the first suspension member 36 about the first pivoting axis 40 causes a translational displacement M3 of the piston rod 52 inside the suspension damper 50 and the suspension spring 54 to be temporarily compressed relatively to its initial spring configuration.

The compression of the suspension spring 54 will generate an increase in the magnitude of the biasing force B. The increase in the magnitude of the biasing force B is proportional to the amount of compression of the suspension spring 54 and to the specific characteristics of the suspension spring 54 and the suspension damper 50. Ultimately, the increase in the reactive forces R,R' will be transmitted to the frame 14, causing an upward impulse of the latter. The magnitude of the impulse on the frame 14 depends on the specific characteristics of the suspension spring 54 and the suspension damper 50.

As mentioned previously, one of the main characteristics of the present invention is that the behaviour of the suspension system 10 will differ substantially from the behaviour of conventional suspension systems in situations wherein the pivotal displacement of one of the suspension table relatively to the frame 14 is different from the pivotal displacement of the other suspension table relatively to the frame 14.

Figure 4:
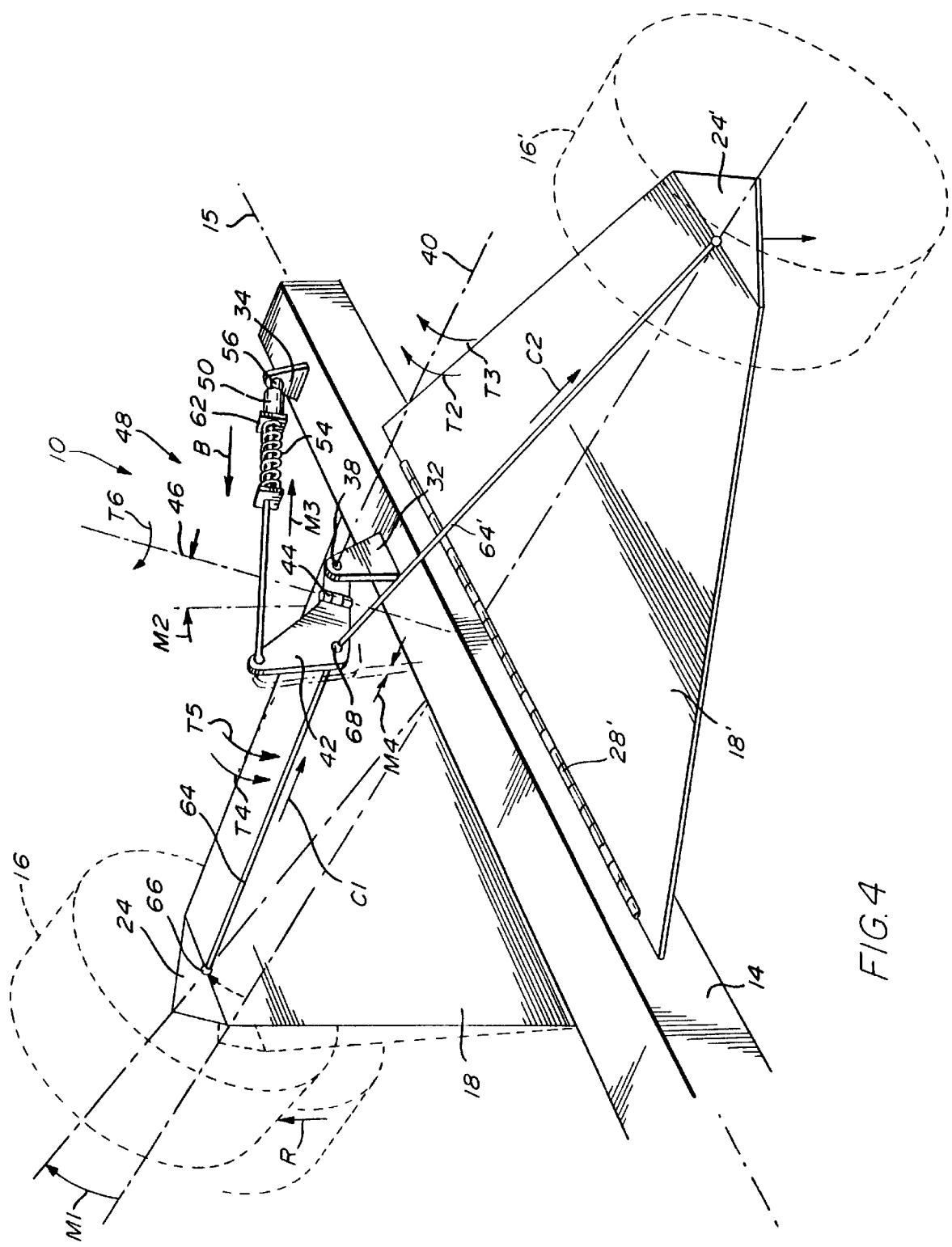
FIG. 4 shows a perspective view of the suspension system of FIG. 1 where one of the wheels to which it is attached is raised while the other wheel remains on the ground surface.

This type of situation of the wheels 16 strikes a one of the wheels 16,16' strikes a road bump. FIGS. 4 and 5 schematically illustrate the relative movements of the various components of the suspension system 10 in a situation wherein the wheel 16 strikes a road bump while the opposed wheel 16' remains on a relatively flat surface.

The initial position of the wheel 16 is shown in dashed lines in FIG 5.

Upon the wheel 16 impacting a road bump, the compression force C1 in the motion transmitting rod 64 will be substantially instantaneously increased. Since the motion transmitting rods 64,64' are both attached to the second suspension member 42 and since the latter is allowed to pivot freely about the second pivotal axis 46, the increase in the compression force C1 will be substantially instantaneously transferred to the motion transmitting rod 64'.

Indeed, since the wheel 16' is abuttingly resting on the ground surface, the increase in the compression force C1 will substantially instantaneously generate an increase in the compression force C2 present in the motion transmitting rod 64'. The increase in the compression force C2 is of substantially the same magnitude as the increase in the compression force C1.

The components of the compression forces C1 and C2 along the Y and X axis will again generate corresponding torques T2 and T3 tending to rotate the first suspension member 36 about the first pivotal axis 40. The angular displacement of the first suspension member 36 about the first member pivoting axis 40 is indicated by the reference M2. The angular displacement M2 of the first suspension member 36 about the first pivoting axis 40 causes a translational displacement M3 of the piston rod 52 inside the suspension damper 50 and the suspension spring 54 to be temporarily compressed relatively to its initial spring configuration.

Ultimately, the striking of the wheel 16 on the road bump will be transmitted to the first spacing component 32 and to the frame 14, causing an upward impulse of the latter. The magnitude of the impulse on the frame 14 depends on various specific characteristics such as the suspension spring rate, the suspension damper rate and the specific geometrical arrangement of the various components making up the suspension system 10.

When the difference between the pivotal displacement of the suspension tables 18,18' transmitted by the motion transmitting rods 64,64' to the second suspension member 42 reaches a predetermined value, the latter will be forced to pivot about the second pivotal axis 46. The angular displacement of the second suspension member 42 about the second pivotal axis 46 is denoted in FIG. 4 by the reference M4.

The angular displacement M4 of the second suspension member 42 about the second pivotal axis 46 also causes a translational displacement of the piston rod 52, a compression of the suspension spring 54 and consequently an increase in the magnitude of the biasing force B.

Figure 6:
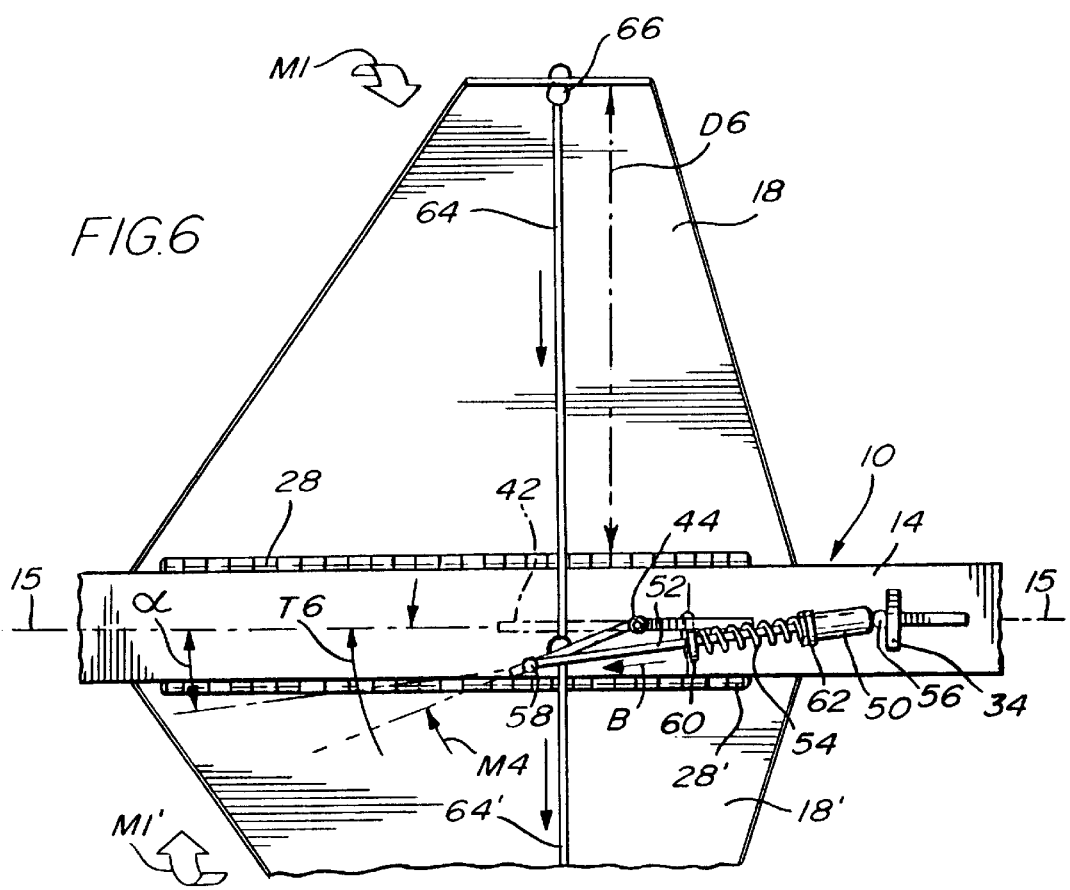
FIG. 6 shows a partial top plan view of the suspension system of FIG. 1 where the schematized vehicle frame to which the suspension is mounted is in a roll situation, i.e. when the wheels are moved, in relation to the frame, of an essentially equal amplitude but in opposite direction.

FIG. 6 illustrates a partial top plan view of the suspension system of FIG. 1 where the schematized vehicle frame 14 to which the suspension 10 is mounted is in a roll situation, i.e. when the tables 18' and 18" are moved, in relation to the frame 14, of an essentially equal amplitude but in opposite direction as illustrated by arrows M1 and M1', respectively. The situation of FIG. 6 happens when the vehicle 12 is subjected to a lateral acceleration, for example, when negotiating a bend.

As will be easily understood by one skilled in the art, the situations illustrated in FIGS. 4 and 6 are similar with respect to the attitude of the suspension 10.

In instances such as the one illustrated in FIGS. 4 and 6, the second suspension member 42 pivots about the second pivotal axis 46. The increase in the biasing force B is thus caused both by the angular displacement M4 of the second suspension member 42 about the second pivotal axis 46 and the angular displacement M2 of the first suspension member 36 about the first member pivoting axis 40.

The biasing force B pushes on the second suspension member 42 via the piston rod 52 and generates a torque T6 which tends to rotate the second suspension member 42 about the back towards its initial position illustrated in dashed lines in FIGS. 4 and 6. The torque T6 is generated by the components of the biasing force B applied on the second suspension member 42 and which extend in a direction perpendicular to the second pivotal axis 46.

The specific geometrical configuration of the suspension system 10 allows for the torque T6 to generate a so-called self-centering effect. The self-centering effect is such that the torque T6 always tends to pivot the second suspension member 42 towards a position wherein the biasing arrangement 48 to which it is attached is substantially symmetrically disposed relatively to the longitudinal axis 15 of the frame 14.

Furthermore, the so-called self-centering effect has a rising rate type of property. Indeed, the more the second suspension member 42 is pivoted about the second pivoting axis 46, away from its original centered position, the more the self-centering torque T6 will increase in magnitude as will be hereinafter be discussed.

When the suspension is in the position of FIG. 6, the biasing force B forms an angle α relatively to its original position prior to the rotation of the second suspension member 42.

The increase in the magnitude of the torque T6 when the second suspension member 42 is pivoted about the second member axis 46, is imputable in part to the increase of angle. Indeed, as the angle α is increased, the magnitude of the component of the biasing force B perpendicular to the second pivotal axis 46, which generates the self-centering torque T6, is increased.

The resistance of the biasing force B to the free pivotal movement of the second suspension member 42 about the second pivotal axis 46 constitutes an anti-roll effect which tends to limit the relative displacement of the frame 14 relatively to the wheels 16,16'. For a given suspension system geometry, the increase of the anti-roll effect increases with the pivotal displacement M4. Small differences in the relative displacements of opposed suspension tables 18,18' will create a relatively small pivotal displacement M4 of the second suspension member 42 about the second pivotal axis 46. In turn, the small pivotal displacement M4 of the second suspension member 42 about the second pivotal axis 46 will only generate a very small self-centering torque T6 and consequently will also only generate a very weak resistance to the roll of the frame 14 about the longitudinal axis 15.

Conversely, larger differences in the relative displacements of opposed suspension tables 18,18' will create a larger pivotal displacement M4 of the second suspension member 42 about the second pivotal axis 46. In turn, the larger pivotal displacement M4 of the second suspension member 42 about the second pivotal axis 46 will generate a much stronger self-centering torque T6 and consequently will also generate a much stronger resistance to the roll of the frame 14 about the longitudinal axis 15.

Since the magnitude of the biasing force B is proportional to the compressive load applied on the spring 54, when the suspension system 10 is used on racing vehicle having devices adapted to generate aerodynamical downforces, the self-centering torque T6 will be increased with an increase in the vehicle speed. Indeed, the aerodynamical downforces will cause the ground reactive forces schematized by the arrows R and, consequently the biasing force B, to increase, resulting in a greater self-centering torque T6 for a given angle α. Thus, the suspension system 10 will become somewhat stiffer in roll as the speed of the vehicle is increased. The suspension system 10 is therefore "reactive" to the added aerodynamic downforce. This characteristic represents yet another advantage over most conventional suspension systems since the suspension system stiffness will self-adapt to the speed of the vehicle.

The ratio between the spacing distances D2 and D3 (see FIG. 2) is one of many geometrical characteristics that will also influence the anti-roll behaviour of the suspension system 10. For example, by decreasing the distance D3 it is possible to increase both the angle α and the self-centering torque T6 without modifying other parameters of the suspension 10. Similarly, by increasing the distance D2 both the angle α and the self-centering torque T6 may be increased.

While FIGS. 1 through 6 illustrate schematically a first embodiment of a suspension system 10, according to the present invention, and the various forces and torques applied to the suspension system 10 in different situations, FIGS. 7 through 10 illustrate the configuration of second embodiment of a suspension 110 according to the present invention.

It is to be noted that similar numbers in FIGS. 7–10 and in FIGS. 1–6 refer to similar components.

Figure 7:
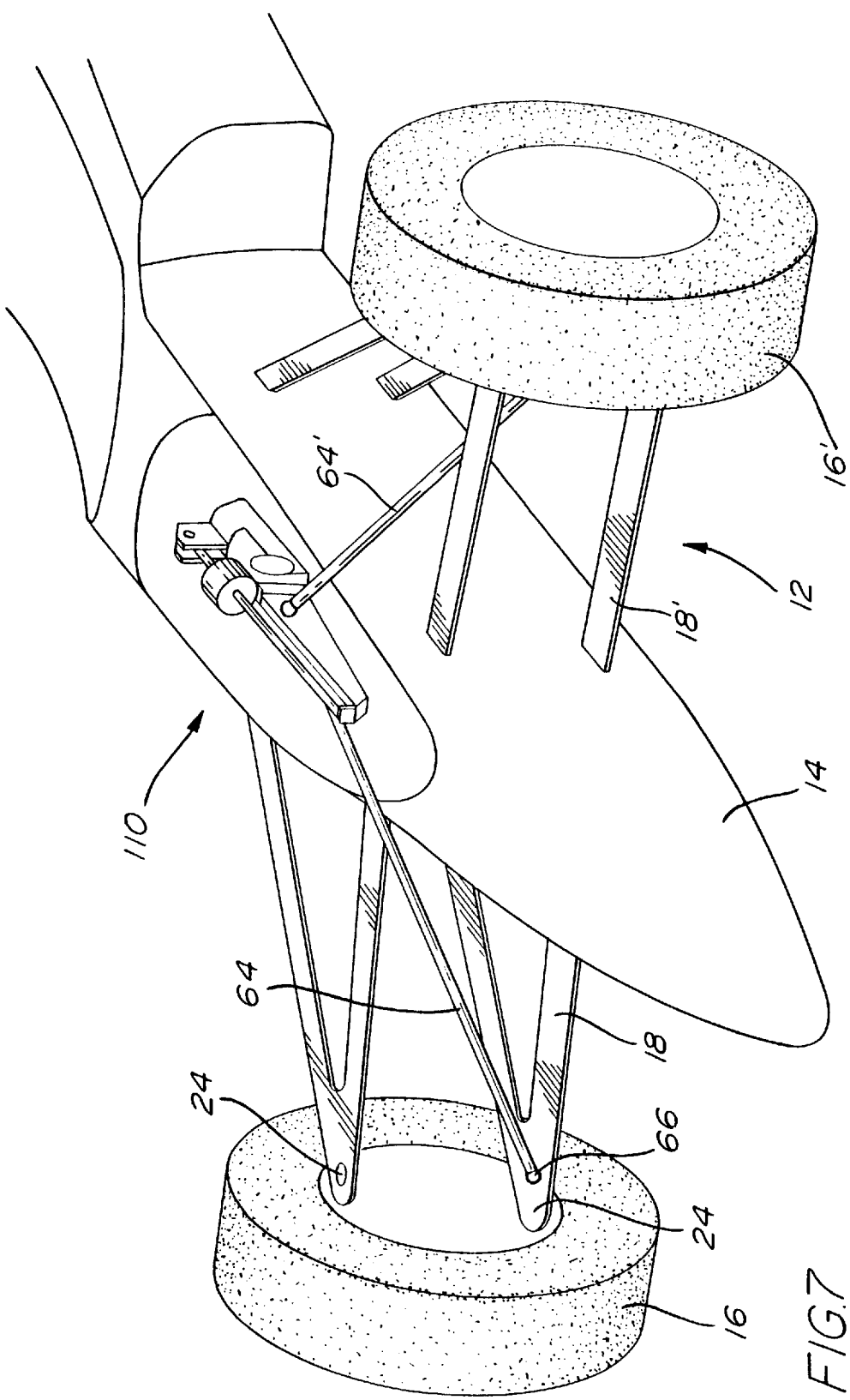
FIG. 7 shows a perspective view of a suspension system according to a second embodiment of the present invention in a symmetrically loaded configuration.
Figure 8:
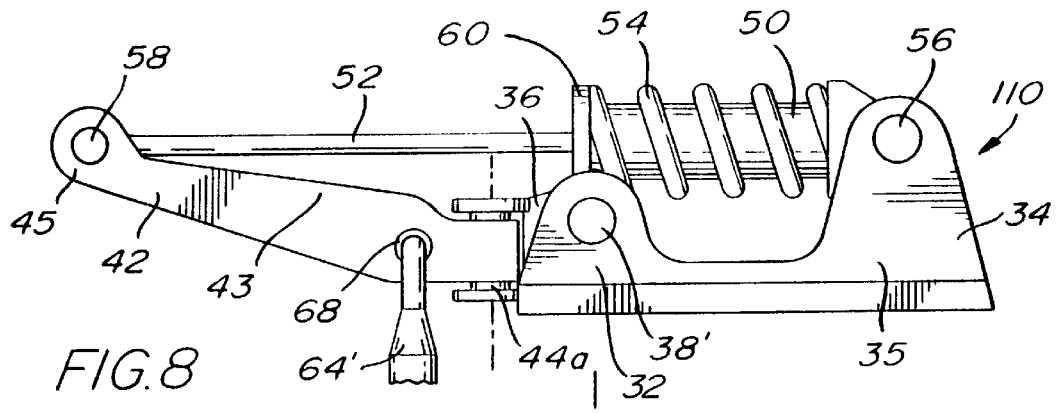
FIG. 8 shows a side elevational view of the suspension system of FIG. 7 in a symmetrically loaded configuration with sections taken out.
Figure 9:
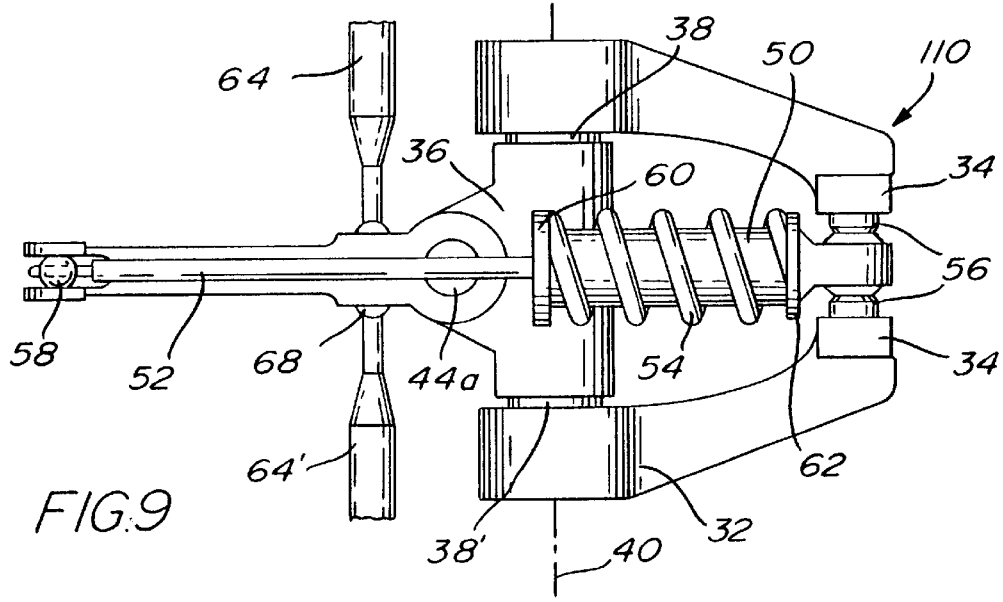
FIG. 9 shows a top plan view of the suspension system of FIG. 7 in a symmetrically loaded configuration with sections taken out.
Figure 10:
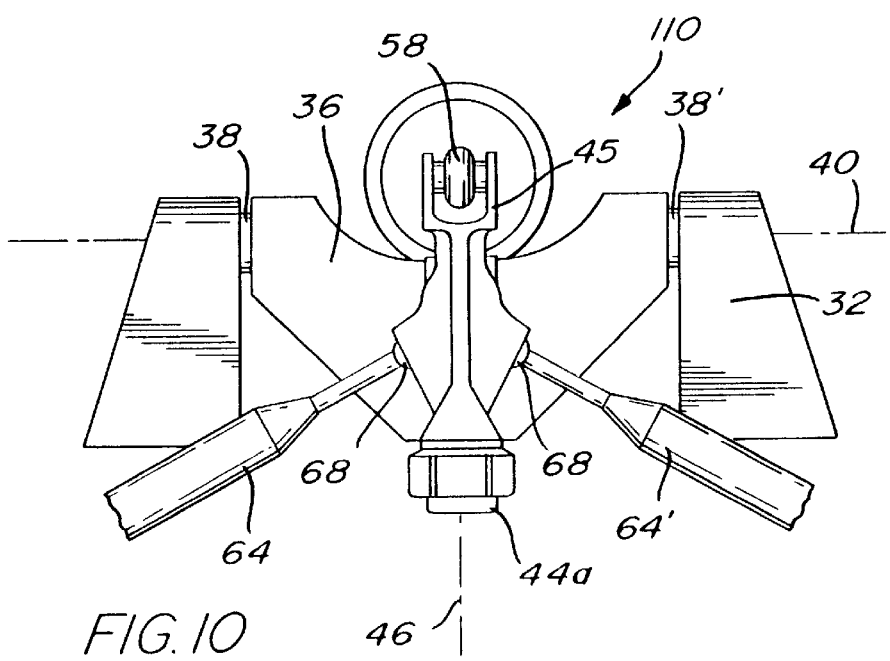
FIG. 10 shows a front elevational view of the suspension system of FIG. 7 in a symmetrically loaded configuration with sections taken out.

As illustrated in FIG. 7, each suspension table 18,18' preferably takes the form of a set of linkage arms assembled so as to form a pair of substantially "V"-shaped superposed assemblies. As illustrated in FIGS. 7 and 8, the first and second spacing components 32 and 34 are preferably formed out of an integral piece of material 35 with the first spacing component 32 having a substantially V-shaped configuration when seen in the direction of the x axis (see FIG. 10 which is front elevational view of the suspension 110).

The first suspension member 36 is pivotally mounted to the first spacing component 32, between the arms of its V-shaped configuration, by a pivoting pins 38,38'. The first suspension member 36 also defines a substantially V-shaped configuration. The second suspension member 42 is pivotally mounted to the first suspension member 36 through a pivoting pin 44a replacing the hinge-type connection 44 of FIGS. 1–6. The second suspension member 42 preferably has a substantially elongated configuration.

As will be easily understood by one skilled in the mechanical art, the suspension 110 of FIGS. 7–10 will react substantially in the same manner to the motions of the wheels 16,16' of the vehicle 12 to which it is mounted as described hereinabove with respect to suspension 10 of FIGS. 1–6.

It should be understood that the specific geometry and size of the various components should be optimized for each specific situation and, hence, a suspension system using the hereinabove mentioned characteristics could be configured differently without departing from the scope of the present invention.

Although the present invention has been described hereinabove by way of a preferred embodiment thereof, this embodiment can be modified at will, within the scope of the appended claims, without departing from the spirit and nature of the subject invention.

What is claimed is:

1. A suspension system for controlling the relative displacement between a pair of laterally opposed ground engaging assemblies of a vehicle and a longitudinal frame of the vehicle, said suspension system comprising:

a first suspension member;

means for mounting said first suspension member to the frame while allowing said first suspension member and the frame to pivot relatively to one another about a first pivotal axis substantially transversal to the frame;

a second suspension member;

means for mounting said second suspension member to said first suspension member while allowing said first suspension member and said second suspension member to pivot relatively to one another about a second pivotal axis, said second pivotal axis being substantially perpendicular to said first pivotal axis;

a biasing assembly swingably mounted between the frame and said second suspension member for biasing said second suspension member towards a predetermined position;

a pair of elongated motion transmitting members, each said elongated motion transmitting member having a distal end swingably mounted to one of the laterally opposed ground engaging assemblies, and a proximate end swingably mounted to said second suspension member;

wherein relative displacement between the pair of laterally opposed ground assemblies and the longitudinal frame of the vehicle is transferred to said biasing assembly by said elongated motion transmitting members and said second suspension member to thereby enable said biasing assembly to control the relative displacement.

2. A suspension system as defined in claim 1 wherein said biasing assembly includes (a) a suspension damper element swingably mounted to one of said frame and said second suspension member, (b) a piston rod slidably engaged in said damper element and swingably mounted to the other of said frame and said second suspension member, and (c) a suspension spring mounted to said damper element and to said piston rod for producing a biasing force biasing said second suspension member towards said predetermined position.

3. A suspension system as defined in claim 2, wherein said suspension damper element is swingably mounted to the frame through a spacing element, and wherein said piston rod is swingably mounted to said second suspension member.

4. A suspension system as defined in claim 1, wherein said biasing assembly is swingably mounted to the frame through a universal-type joint.

5. A suspension system as defined in claim 4, wherein said biasing assembly is swingably mounted to said second suspension member through a universal-type joint.

6. A suspension system as defined in claim 5, wherein said second suspension member is configured so that said first pivotal axis, said proximate end of each said elongated motion transmitting member and said universal-type joint mounting said biasing assembly to said second suspension member form an obtuse angle, said proximate end of each said elongated motion transmitting member being a vertex of said obtuse angle.

7. A suspension system as defined in claim 1, wherein each said proximate end of said pair of elongated motion transmitting members is swingably mounted to said second suspension member through a universal-type joint.

8. A suspension system as defined in claim 7, wherein each said distal end of said pair of elongated motion transmitting members is swingably mounted to one of the laterally opposed ground engaging assemblies through a universal-type joint.

9. A suspension system as defined in claim 8, wherein said second suspension member is substantially V-shaped.

10. A suspension system as defined in claim 9, wherein said second suspension member is substantially flat.

11. A suspension system as defined in claim 1, wherein said predetermined position of said second suspension member is substantially parallel to the longitudinal frame.

12. A suspension system as defined in claim 11, wherein (a) said second suspension member is substantially flat, (b) said first pivotal axis defines a first contact point, (c) a second contact point is defined at a junction between said proximate ends of said elongated motion transmitting members and said second suspension member, (d) a third contact point is defined at a junction between said biasing assembly and said second suspension member, and (e) said first, second and third contact points form an obtuse angle, said second contact point being a vertex of said obtuse angle.

13. A suspension system as defined in claim 1, wherein said first and second pivotal axes are spaced apart.

14. A suspension system as defined in claim 1, wherein said means for mounting said first suspension member to the frame include a first spacing component mounted to the frame and a first pivotal pin connecting said first suspension member to said first spacing component.

15. A suspension system as defined in claim 14, wherein said means for mounting said second suspension member to said first suspension member includes a substantially V-shaped portion of said first suspension member and a second pivotal pin connecting said second suspension member to said V-shaped portion of said first suspension member.

16. A suspension system as defined in claim 15, wherein said first spacing component has a substantially V-shaped configuration defining a pair of first spacing component arms, said first suspension member being pivotally fixed to the said first spacing component between said pair of first spacing component arms by said first pivotal pin.

* * * * *